United States Patent
Funakawa

(10) Patent No.: US 6,611,332 B2
(45) Date of Patent: *Aug. 26, 2003

(54) WAVELENGTH-VARIABLE LIGHT SOURCE APPARATUS

(75) Inventor: Seiji Funakawa, Tokyo (JP)

(73) Assignee: Ando Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/239,792

(22) Filed: Jan. 29, 1999

(65) Prior Publication Data

US 2001/0013932 A1 Aug. 16, 2001

(30) Foreign Application Priority Data

Jan. 30, 1998 (JP) .......................... 10-019798

(51) Int. Cl.[7] .............................. H01S 3/067
(52) U.S. Cl. ........................ 356/402; 372/96
(58) Field of Search ................. 356/357, 359, 356/358, 360; 128/633, 664–666; 351/41; 359/118, 120, 121, 122, 123, 124, 125, 128, 132, 133, 161, 152, 173, 187; 372/107, 20, 96

(56) References Cited

U.S. PATENT DOCUMENTS

| 4,977,564 A | | 12/1990 | Ryu et al. | |
| 5,450,207 A | * | 9/1995 | Fomenkov | 356/416 |
| 5,533,509 A | * | 7/1996 | Koashi | 128/633 |
| 5,801,861 A | * | 9/1998 | Majima | 359/124 |
| 5,949,562 A | * | 9/1999 | Kubota | 359/124 |
| 5,956,141 A | * | 9/1999 | Hayashi | 356/357 |
| 6,229,832 B1 | * | 5/2001 | Baba et al. | 372/38.01 |
| 6,240,119 B1 | * | 5/2001 | Ventrudo | 372/96 |
| 6,377,592 B1 | * | 4/2002 | Auracher et al. | 372/9 |

FOREIGN PATENT DOCUMENTS

| CA | 2210123 | 1/1998 |
| EP | 0529731 | 3/1993 |

* cited by examiner

*Primary Examiner*—Paul Ip
*Assistant Examiner*—Dung Nguyen
(74) *Attorney, Agent, or Firm*—Finnegan, Henderson, Farabow, Garrett & Dunner LLP

(57) ABSTRACT

A wavelength-variable light source apparatus having a wavelength measurement function for measuring the wavelength characteristic of an object to be measured. In the apparatus, a CPU outputs control signals for controlling components of a light power meter section via a bus for controlling a light detection operation. When the CPU obtains light detection level data detected by the light power meter section from light passing through an object to be measured, the CPU stores the light detection level data for each wavelength in the object to be measured in an RAM and causes a display control section to display the light detection level on a display section. Further, the CPU executes wavelength analysis processing according to a wavelength analysis program stored in an ROM, analyzes the light wavelength characteristic of the object to be measured based on the light detection level data for each wavelength stored in the RAM, and causes the display control section to display the analysis result on the display section.

9 Claims, 2 Drawing Sheets

WAVELENGTH-VARIABLE LIGHT SOURCE APPARATUS

BACKGROUND OF THE INVENTION

1. Field of the Invention

This invention relates to a wavelength-variable light source apparatus containing a light power meter and having a wavelength measurement function for measuring the wavelength characteristic of an object to be measured.

2. Description of the Related Art

Hitherto, normally a semiconductor laser of an external resonator type (the semiconductor laser will be hereinafter referred to as LD) has been used as a wavelength-variable light source and an optical filter which is a wavelength selection element has been inserted into an external resonator for providing single-mode oscillation. The wavelength passing through (or reflected on) the optical filter is made mechanically variable, thereby enabling wavelength sweeping in a wide range.

A light wavelength analysis system is realized which uses such a wavelength-variable light source and a light spectrum analyzer in combination for measuring the wavelength characteristic of an object to be measured and displaying and analyzing the wavelength characteristic.

Another light wavelength analysis system is also realized wherein a wavelength-variable light source and a light power meter are connected to a personal computer and are controlled from the personal computer for measuring the wavelength characteristic of an object to be measured and displaying and analyzing the wavelength characteristic on the personal computer.

However, the conventional light wavelength analysis system comprising a wavelength-variable light source and a light spectrum analyzer in combination involves the following problem:

With the light spectrum analyzer, if an attempt is made to analyze the wavelength of light emitted from the wavelength-variable light source at high resolution, it is necessary to take a long focal length of swept light as a restriction of the structure of the light spectrum analyzer. Inevitably, the cabinet of the light spectrum analyzer is upsized as compared with the size of the wavelength-variable light source and improvement in the wavelength resolution is limited. Therefore, it is impossible to build the light spectrum analyzer in a wavelength-variable light source apparatus and reduce the costs of the light wavelength analysis system; since the structure of the light spectrum analyzer itself is complicated, it is furthermore difficult to reduce costs of the light wavelength analysis system.

Further, to measure the wavelength characteristic, the wavelength to be detected needs to be calibrated between the wavelength-variable light source and the light spectrum analyzer, thus intricate operation to measurement becomes necessary and ease of operation needs also be considered.

With the conventional light wavelength analysis system comprising a wavelength-variable light source and a light power meter connected to a personal computer, the personal computer becomes necessary in addition to the wavelength-variable light source and the light power meter, thus it is difficult to reduce the costs of the light wavelength analysis system.

Further, since the wavelength-variable light source and the light power meter are controlled from the personal computer for measuring the wavelength characteristic of an object to be measured, a restriction that the measurement speed is determined by the control signal transmission speed from the personal computer to the wavelength-variable light source and the light power meter occurs and speeding up the wavelength measurement is hindered.

SUMMARY OF THE INVENTION

It is therefore an object of the invention to provide a wavelength-variable light source apparatus which contains a light power meter, can speed up wavelength measurement and simplify measurement operation while maintaining high wavelength resolution, and has a display function and an analysis function of the wavelength characteristic of an object to be measured for providing a light wavelength analysis system at low costs.

In order to achieve the above object, according to a first aspect of the invention, there is provided a wavelength-variable light source apparatus comprising: a wavelength-variable light source section having an external resonance part for externally resonating emitted light from a semiconductor laser light source at a predetermined wavelength and for varying an external resonance condition in the external resonance part; a control section for controlling the wavelength in the wavelength-variable light source section; and a light detection section for allowing light of each wavelength emitted from the wavelength-variable light source section to be incident on an object to be measured and detecting a light output level of output light of each wavelength emitted from the object to be measured, wherein the control section analyzes a light wavelength characteristic of the object to be measured based on the light output level of each wavelength detected by the light detection section.

Therefore, wavelength measurement can be speeded up and measurement operation can be simplified while high wavelength resolution is maintained, and the wavelength-variable light source apparatus forming a light wavelength analysis system at low costs can be provided without using a large-sized and expensive spectrum analyzer, a personal computer for external control, or the like as in the conventional system.

Further, according to a second aspect of the invention, there is provided a wavelength-variable light source apparatus comprising: a wavelength-variable light source section having an external resonance part for externally resonating emitted light from a semiconductor laser light source at a predetermined wavelength and for varying an external resonance condition in the external resonance part; a control section for controlling the wavelength in the wavelength-variable light source section; and a light detection section for allowing light of each wavelength emitted from the wavelength-variable light source section to be incident on an object to be measured, detecting a light output level of output light of each wavelength emitted from the object to be measured, and sending a signal indicating the light output level to the control section over an exclusive communication line, wherein the control section has a communication function for connecting to the light detection section over the exclusive communication line and analyzes a light wavelength characteristic of the object to be measured based on the light output level of each wavelength sent by the light detection section.

Therefore, wavelength measurement can be speeded up and measurement operation can be simplified while high wavelength resolution is maintained, and the wavelength-variable light source apparatus forming a light wavelength analysis system at low costs can be provided without using a large-sized and expensive spectrum analyzer, a personal computer for external control, or the like as in the conventional system. Further, transfer of the control signals and the light output level signal between the control section and the light detection section can be speeded up owing to the exclusive communication line; the measurement speed can be more increased.

DETAILED DESCRIPTION OF THE PREFERRED EMBODIMENTS

Referring now to the accompanying drawings, there are shown preferred embodiments of the invention.
(First Embodiment)

Figure 1:
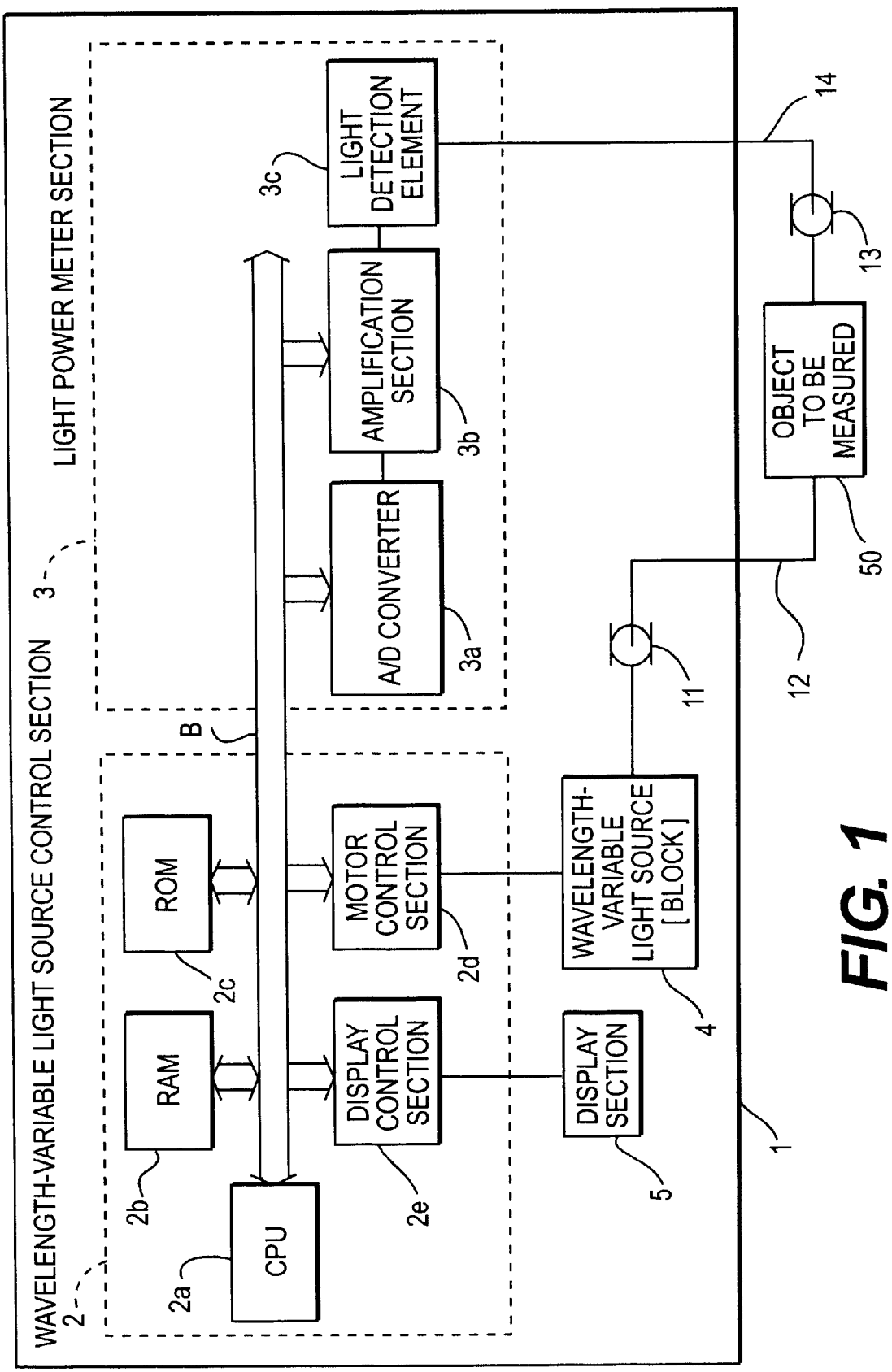
FIG. 1 is a block diagram to show the configuration of a control system of a wavelength-variable light source apparatus in a first embodiment incorporating the invention.

FIG. 1 is a block diagram to show the configuration of a control system of a wavelength-variable light source apparatus 1 in a first embodiment incorporating the invention.

First, the configuration of the wavelength-variable light source apparatus 1 will be described.

In FIG. 1, the wavelength-variable light source apparatus 1 comprises a wavelength-variable light source section 2, a light power meter section 3, a wavelength-variable light source block 4, and a display section 5. The wavelength-variable light source section 2 and the light power meter section 3 are connected to each other by a bus B and control signals, light detection data, and the like are transferred therebetween through the bus B. Light emitted by the wavelength-variable light source block 4 is swept to an object 50 to be measured through an optical connector 11 and an optical fiber 12, and light passing through the object 50 to be measured is emitted to the light power meter section 3 through an optical connector 13 and an optical fiber 14.

The wavelength-variable light source section 2 comprises a central processing unit (CPU) 2a, a random access memory (RAM) 2b, a read-only memory (ROM) 2c, a motor control section 2d, and a display control section 2e, which are connected to the bus B.

The CPU 2a executes wavelength-variable control processing according to a wavelength-variable control program stored in the ROM 2c. The CPU 2a outputs a motor control signal to the motor control section 2d based on a table stored in the RAM 2b and setting the relationship between emitted light wavelength $\lambda$ and motor rotation move amount (for example, the number of pulses indicating the move amount of a pulse motor) for causing the motor control section 2d to rotate and move the pulse motor in the wavelength-variable light source block 4 for varying the emitted light wavelength $\lambda$, checks the emitted light wavelength $\lambda$ based on a position signal (rotary encode signal) fed back from the motor control section 2d, and stops rotating and moving the pulse motor.

The CPU 2a outputs control signals for controlling the components of the light power meter section 3 via the bus B for controlling the light detection operation. When the CPU 2a obtains light detection level data detected by the light power meter section 3 from light passing through the object 50 to be measured via the bus B, the CPU 2a stores the light detection level data for each wavelength in the object 50 to be measured in the RAM 2b and causes the display control section 2e to display the light detection level on the display section 5.

Further, the CPU 2a executes wavelength analysis processing according to a wavelength analysis program stored in the ROM 2c, analyzes the light wavelength characteristic of the object 50 to be measured based on the light detection level data for each wavelength obtained from the light power meter section 3 and stored in the RAM 2b, and causes the display control section 2e to display the analysis result on the display section 5.

The RAM 2b stores the table setting the relationship between wavelength $\lambda$ of light emitted from the wavelength-variable light source block 4 and motor rotation move amount (for example, the number of pulses indicating the move amount of the pulse motor) and the like, and forms a work area, required when the CPU 2a performs processing, for temporarily storing the light detection level data, the light wavelength analysis result of the object 50 to be measured, and the like. The ROM 2c stores the wavelength-variable control program, the wavelength analysis program, and the like, which are executed by the CPU 2a.

The motor control section 2d supplies a drive signal to the pulse motor in the wavelength-variable light source block 4 according to the motor control signal input from the CPU 2a for rotating and moving the pulse motor for varying the emitted light wavelength $\lambda$ and receives a rotary encode signal indicating the rotation and move amount from the pulse motor, then outputs the rotary encode signal to the CPU 2a as a position signal.

The display control section 2e controls the display contents of the display section 5 based on the display control signal input from the CPU 2a and causes the display section 5 to display the light detection level for each wavelength in the object 50 to be measured, the analysis result of the light wavelength characteristic of the object 50 to be measured, and the like.

The wavelength-variable light source block 4 uses an LD of an external resonator type (not shown). The mechanical position of the reflection plane with respect to a diffraction grating (not shown) as an optical filter forming an external resonator is moved by the contained pulse motor, whereby the external resonance condition is varied and the emitted light wavelength $\lambda$ can be made variable in a wide range (minimum wavelength $\lambda 0$ to maximum wavelength $\lambda MAX$). The emitted light from the wavelength-variable light source block 4 is emitted to the external object 50 to be measured as output light through the optical fiber 12 and the optical connector 11. The wavelength-variable light source block 4 contains an LD drive section (not shown) for generating a drive current for driving the LD.

The display section 5 is formed of a cathode-ray tube (CRT), a liquid crystal display panel, or the like and is controlled by the display control section 2e for displaying the light detection level for each wavelength in the object 50 to be measured, the analysis result of the light wavelength characteristic of the object 50 to be measured, and the like.

The light power meter section 3 comprises an A/D converter 3a, an amplification section 3b, and a light detection element 3c, which are connected to the bus B common to the wavelength-variable light source section 2.

The emitted light from the wavelength-variable light source block 4 passes through the object 50 to be measured and is incident on the light detection element 3c via the optical connector 13 and the optical fiber 14. The light detection element 3c receives the incident light and converts the light into a light detection signal at a predetermined voltage level in response to the light strength received with the light reception sensitivity characteristic responsive to the wavelength of the light, then outputs the light detection signal to the amplification section 3b.

The amplification section 3b amplifies the light detection signal input from the light detection element 3c at a predetermined amplification factor based on a control signal input from the CPU 2a in the wavelength-variable light source section 2 via the bus B and outputs the amplified light detection signal to the A/D converter 3a.

The A/D converter 3a converts the light detection signal input from the amplification section 3b from analog form to digital form based on a control signal input from the CPU 2a in the wavelength-variable light source section 2 via the bus B and outputs the conversion result to the CPU 2a as the light detection level data indicating the light detection level.

The object 50 to be measured 50 is set to measure the light wavelength characteristic of an optical filter, a communication optical fiber, or the like, for example.

Next, the operation of the wavelength-variable light source apparatus 1 in the first embodiment will be described.

In the wavelength-variable light source apparatus 1 in FIG. 1, first the CPU 2a in the wavelength-variable light source section 2 executes wavelength-variable control processing according to the wavelength-variable control program stored in the ROM 2c and outputs a motor control signal to the motor control section 2d so as to set initial wavelength λ0 based on the table stored in the RAM 2b and setting the relationship between emitted light wavelength λ and motor rotation move amount. The motor control section 2d outputs a drive control signal to the wavelength-variable light source block 4 based on the motor control signal input from the CPU 2a for starting to rotate and move the pulse motor in the wavelength-variable light source block 4 to the initial position of the pulse motor. At this time, in the wavelength-variable light source block 4, the mechanical position of the reflection plane with respect to the diffraction grating forming the external resonator is moved to the initial position by the pulse motor, whereby the external resonance condition is initialized and a predetermined drive current is supplied from the LD drive section to the LD, whereby light of the initial wavelength λ0 based on the initial external resonance condition is emitted to the object 50 to be measured through the optical fiber 12.

The CPU 2a checks that the emitted light becomes the initial wavelength λ0 based on the position signal (rotary encode signal) input from the motor control section 2d, and stops drive control in the motor control section 2d. At this time, the light power meter section 3 detects the light detection level of the light passing through the object 50 to be measured corresponding to the wavelength λ0 and outputs the light detection level data to the CPU 2a, which then stores the light detection level data in the RAM 2b and causes the display control section 2e to display the light detection level of the wavelength λ0 in the object 50 to be measured on the display section 5 based on the light detection level data.

Next, when the CPU 2a outputs a motor control signal to the motor control section 2d so as to change from the initial wavelength λ0 to an arbitrary variable wavelength λ1 based on the table stored in the RAM 2b and setting the relationship between the emitted light wavelength λ and motor rotation move amount, the motor control section 2d outputs a drive control signal to the wavelength-variable light source block 4 for starting to rotate and move the pulse motor in the wavelength-variable light source block 4 to the set position corresponding to the wavelength λ1.

At this time, in the wavelength-variable light source block 4, the mechanical position of the reflection plane with respect to the diffraction grating forming the external resonator is moved from the initial position to the set position corresponding to the wavelength λ1 by the pulse motor, whereby the external resonance condition is set to the wavelength λ1 state and a predetermined drive current is supplied from the LD drive section to the LD, whereby light of the wavelength λ1 based on the external resonance condition of the wavelength λ1 is emitted to the external object 50 to be measured through the optical fiber 12.

The CPU 2a checks that the emitted light becomes the wavelength λ1 based on the position signal (rotary encode signal) input from the motor control section 2d, and stops drive control in the motor control section 2d. At this time, the light power meter section 3 outputs the light detection level data of the light passing through the object 50 to be measured corresponding to the wavelength λ1 to the CPU 2a, which then causes the display control section 2e to display the light detection level of the wavelength λ1 in the object 50 to be measured on the display section 5 based on the light detection level data.

Thus, the CPU 2a in the wavelength-variable light source section 2 executes the wavelength-variable control processing, thereby varying the wavelength λ of the light emitted from the wavelength-variable light source block 4 at predetermined wavelength intervals based on the table stored in the RAM 2b and setting the relationship between the emitted light wavelength λ and motor rotation move amount and causing the emitted light of each wavelength to pass through the object 50 to be measured.

The CPU 2a stores the light detection level data of each wavelength detected by the light power meter section 3 from the light of each wavelength passing through the object 50 to be measured in the RAM 2b and causes the display control section 2e to display the light detection level of each wavelength on the display section 5.

Next, the CPU 2a in the wavelength-variable light source section 2 executes the wavelength analysis processing according to the wavelength analysis program stored in the ROM 2c and analyzes the transmission characteristic of each wavelength of an optical filter, a communication optical fiber, or the like, as the object 50 to be measured based on the light detection level data of each wavelength stored in the RAM 2b, then stores the analysis result in the RAM 2b and causes the display control section 2e to display the analysis result on the display section 5.

As described above, the wavelength-variable light source apparatus 1 in the first embodiment contains the light power meter section 3 and the display section 5 for displaying information and the CPU 2a in the wavelength-variable light source section 2 has the wavelength-variable control processing function and the wavelength analysis processing function and enables displaying of the light detection level and the wavelength analysis result in each wavelength of the object 50 to be measured on the display section 5. Thus, the wavelength measurement can be speeded up and the measurement operation can be simplified while high wavelength resolution is maintained.

Therefore, a wavelength-variable light source apparatus forming a light wavelength analysis system at low costs can be provided without using a large-sized and expensive spectrum analyzer, a personal computer for external control, or the like as in the conventional system.

(Second Embodiment)

Figure 2:
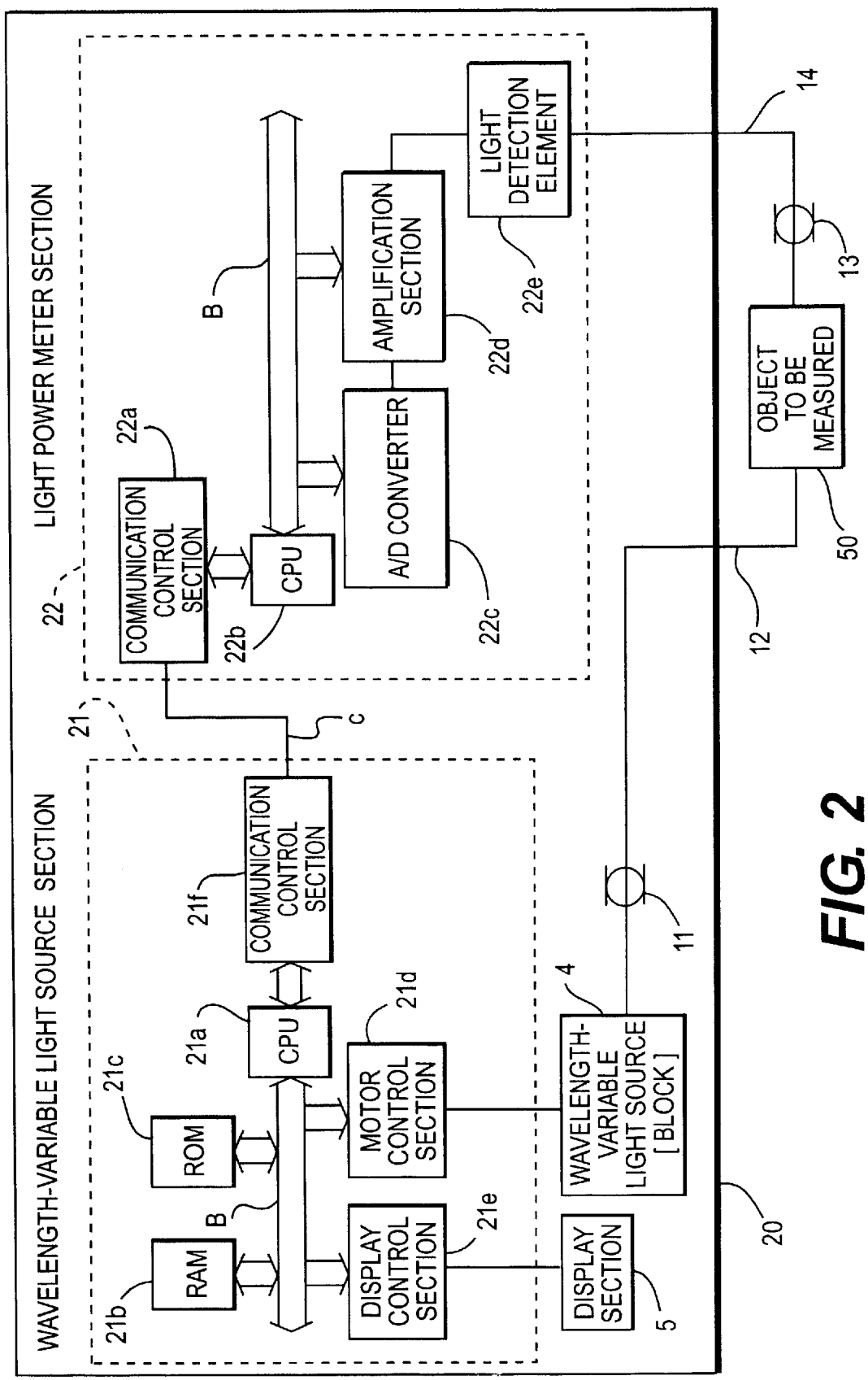
FIG. 2 is a block diagram to show the configuration of a control system of a wavelength-variable light source apparatus in a second embodiment incorporating the invention.

FIG. 2 is a block diagram to show the configuration of a control system of a wavelength-variable light source apparatus 20 in a second embodiment incorporating the invention. Parts identical with or similar to those previously described with reference to FIG. 1 are designated by the same reference numerals in FIG. 2 and will not be described again.

First, the configuration of the wavelength-variable light source apparatus 20 will be described.

In FIG. 2, the wavelength-variable light source apparatus 20 comprises a wavelength-variable light source section 21, a light power meter section 22, a wavelength-variable light source block 4, and a display section 5. The wavelength-variable light source section 21 and the light power meter section 22 are connected to each other by a communication line C and control signals, light detection data, and the like are transferred therebetween over the communication line C.

The wavelength-variable light source section 21 comprises a CPU 21a, an RAM 21b, an ROM 21c, a motor control section 21d, a communication control section 21f, and a display control section 21e, which are connected to a bus B.

The CPU 21a executes wavelength-variable control processing according to a wavelength-variable control program stored in the ROM 2c. The CPU 21a outputs a motor control signal to the motor control section 21d based on a table stored in the RAM 21b and setting the relationship between emitted light wavelength $\lambda$ and motor rotation move amount (for example, the number of pulses indicating the move amount of a pulse motor) for causing the motor control section 21d to rotate and move the pulse motor in the wavelength-variable light source block 4 for varying the emitted light wavelength $\lambda$, checks the emitted light wavelength $\lambda$ based on a position signal (rotary encode signal) fed back from the motor control section 21d, and stops rotating and moving the pulse motor.

When the CPU 21a obtains light detection level data detected by the light power meter section 22 from light passing through the object 50 to be measured over the communication line C through the communication control section 21f, the CPU 21a stores the light detection level data for each wavelength in the object 50 to be measured in the RAM 21b and causes the display control section 21e to display the light detection level on the display section 5.

Further, the CPU 21a executes wavelength analysis processing according to a wavelength analysis program stored in the ROM 21c, analyzes the light wavelength characteristic of the object 50 to be measured based on the light detection level data for each wavelength obtained from the light power meter section 22 and stored in the RAM 21b, and causes the display control section 21e to display the analysis result on the display section 5.

The RAM 21b stores the table setting the relationship between wavelength $\lambda$ of light emitted from the wavelength-variable light source block 4 and motor rotation move amount (for example, the number of pulses indicating the move amount of the pulse motor) and the like, and forms a work area, required when the CPU 21a performs processing, for temporarily storing the light detection level data, the light wavelength analysis result of the object 50 to be measured, and the like. The ROM 21c stores the wavelength-variable control program, the wavelength analysis program, and the like, which are executed by the CPU 21a.

The motor control section 21d supplies a drive signal to the pulse motor in the wavelength-variable light source block 4 according to the motor control signal input from the CPU 21a for rotating and moving the pulse motor for varying the emitted light wavelength $\lambda$ and receives a rotary encode signal indicating the rotation and move amount from the pulse motor, then outputs the rotary encode signal to the CPU 21a as a position signal.

The communication control section 21f transfers the control signals, light detection level data, and the like, to and from a communication control section 22a in the light power meter section 22 over the communication line C as instructed by the CPU 21a.

The display control section 21e controls the display contents of the display section 5 based on the display control signal input from the CPU 21a and causes the display section 5 to display the light detection level for each wavelength in the object 50 to be measured, the analysis result of the light wavelength characteristic of the object 50 to be measured, and the like.

The light power meter section 22 comprises the above-mentioned communication control section 22a, a CPU 22b, an A/D converter 22c, an amplification section 22d, and a light detection element 22e, which are connected to a bus B.

The communication control section 22a transfers the control signals, light detection level data, and the like, to and from the communication control section 21f in the wavelength-variable light source section 21 over the communication line C as instructed by the CPU 22b.

The CPU 22b outputs control signals for controlling the components of the light power meter section 22 for controlling the light detection operation and instructs the communication control section 22a to transmit the light detection level data input from the A/D converter 22c to the wavelength-variable light source section 21.

The emitted light from the wavelength-variable light source block 4 passes through the object 50 to be measured and is incident on the light detection element 22e via an optical connector 13 and an optical fiber 14. The light detection element 22e receives the incident light and converts the light into a light detection signal at a predetermined voltage level in response to the light strength received with the light reception sensitivity characteristic responsive to the wavelength of the light, then outputs the light detection signal to the amplification section 22d.

The amplification section 22d amplifies the light detection signal input from the light detection element 22e at a predetermined amplification factor based on a control signal input from the CPU 22b and outputs the amplified light detection signal to the A/D converter 22c.

The A/D converter 22c converts the light detection signal input from the amplification section 22d from analog form to digital form based on the control signal input from the CPU 22b and outputs the conversion result to the CPU 22b as the light detection level data indicating the light detection level.

Next, the operation of the wavelength-variable light source apparatus 20 in the second embodiment will be described.

In the wavelength-variable light source apparatus 20 in FIG. 2, first the CPU 21a in the wavelength-variable light source section 21 executes wavelength-variable control processing according to the wavelength-variable control program stored in the ROM 21c and outputs a motor control signal to the motor control section 21d so as to set initial wavelength $\lambda 0$ based on the table stored in the RAM 21b and setting the relationship between emitted light wavelength $\lambda$ and motor rotation move amount. The motor control section 21d outputs a drive control signal to the wavelength-variable light source block 4 based on the motor control signal input from the CPU 21a for starting to rotate and move the pulse motor in the wavelength-variable light source block 4 to the initial position of the pulse motor. At this time, in the wavelength-variable light source block 4, the mechanical position of the reflection plane with respect to a diffraction grating forming an external resonator is moved to the initial position by the pulse motor, whereby the external resonance condition is initialized and a predetermined drive current is supplied from the LD drive section to the LD, whereby light of the initial wavelength $\lambda 0$ based on the initial external resonance condition is emitted to the object 50 to be measured through the optical fiber 12.

The CPU 21*a* checks that the emitted light becomes the initial wavelength $\lambda 0$ based on the position signal (rotary encode signal) input from the motor control section 21*d*, and stops drive control in the motor control section 21*d*. At this time, the light power meter section 22 detects the light detection level of the light passing through the object 50 to be measured corresponding to the wavelength $\lambda 0$ and outputs the light detection level data from the CPU 22*b* in the light power meter section 22 through the communication control section 22*a* to the communication control section 21*f* in the wavelength-variable light source section 21. Then, the CPU 21*a* in the wavelength-variable light source section 21 stores the light detection level data received at the communication control section 21*f* in the RAM 21*b* and causes the display control section 21*e* to display the light detection level of the wavelength $\lambda 0$ in the object 50 to be measured on the display section 5 based on the light detection level data.

Next, when the CPU 21*a* outputs a motor control signal to the motor control section 21*d* so as to change from the initial wavelength $\lambda 0$ to an arbitrary variable wavelength $\lambda 1$ based on the table stored in the RAM 21*b* and setting the relationship between the emitted light wavelength $\lambda$ and motor rotation move amount, the motor control section 21*d* outputs a drive control signal to the wavelength-variable light source block 4 for starting to rotate and move the pulse motor in the wavelength-variable light source block 4 to the setup position corresponding to the wavelength $\lambda 1$.

At this time, in the wavelength-variable light source block 4, the mechanical position of the reflection plane with respect to the diffraction grating forming the external resonator is moved from the initial position to the setup position corresponding to the wavelength $\lambda 1$ by the pulse motor, whereby the external resonance condition is set to the wavelength $\lambda 1$ state and a predetermined drive current is supplied from the LD drive section to the LD, whereby light of the wavelength $\lambda 1$ based on the external resonance condition of the wavelength $\lambda 1$ is emitted to the external object 50 to be measured through the optical fiber 12.

The CPU 21*a* checks that the emitted light becomes the wavelength $\lambda 1$ based on the position signal (rotary encode signal) input from the motor control section 21*d*, and stops drive control in the motor control section 21*d*. At this time, the CPU 22*b* in the light power meter section 22 transmits the light detection level data of the light passing through the object 50 to be measured corresponding to the wavelength $\lambda 1$ through the communication control section 22*a* to the communication control section 21*f* in the wavelength-variable light source section 21. Then, the CPU 21*a* in the wavelength-variable light source section 21 stores the light detection level data received at the communication control section 21*f* and causes the display control section 21*e* to display the light detection level of the wavelength $\lambda 1$ in the object 50 to be measured on the display section 5 based on the light detection level data.

Thus, the CPU 21*a* in the wavelength-variable light source section 21 executes the wavelength-variable control processing, thereby varying the wavelength $\lambda$ of the light emitted from the wavelength-variable light source block 4 at predetermined wavelength intervals based on the table stored in the RAM 21*b* and setting the relationship between the emitted light wavelength $\lambda$ and motor rotation move amount and causing the emitted light of each wavelength to pass through the object 50 to be measured.

The CPU 21*a* stores the light detection level data of each wavelength detected by the light power meter section 22 from the light of each wavelength passing through the object 50 to be measured in the RAM 21*b* and causes the display control section 21*e* to display the light detection level of each wavelength on the display section 5.

Next, the CPU 21*a* in the wavelength-variable light source section 2 executes the wavelength analysis processing according to the wavelength analysis program stored in the ROM 21*c* and analyzes the transmission characteristic of each wavelength of an optical filter, a communication optical fiber, or the like, as the object 50 to be measured based on the light detection level data of each wavelength stored in the RAM 21*b*, then stores the analysis result in the RAM 21*b* and causes the display control section 21*e* to display the analysis result on the display section 5.

As described above, the wavelength-variable light source apparatus 20 in the second embodiment contains the light power meter section 22 and the display section 5 for displaying information and the CPU 21*a* in the wavelength-variable light source section 21 has the wavelength-variable control processing function and the wavelength analysis processing function and enables displaying of the light detection level and the wavelength analysis result in each wavelength of the object 50 to be measured on the display section 5. Thus, the wavelength measurement can be speeded up and the measurement operation can be simplified while high wavelength resolution is maintained.

Therefore, a wavelength-variable light source apparatus forming a light wavelength analysis system at low costs can be provided without using a large-sized and expensive spectrum analyzer, a personal computer for external control, or the like as in the conventional system.

The wavelength-variable light source apparatus 20 in the second embodiment contains the wavelength-variable light source section 21 and the light power meter section 22 connected by the exclusive communication line C for transferring the control signals and the light detection level data between the CPU 21*a* in the wavelength-variable light source section 21 and the CPU 22*b* in the internal light power meter section 22 through the communication control sections 21*f* and 22*a* connected to the exclusive communication line C, so that the measurement speed can be more increased as the communication therebetween is speeded up.

According to the wavelength-variable light source apparatus of the invention, the wavelength measurement can be speeded up and the measurement operation can be simplified while high wavelength resolution is maintained; the wavelength-variable light source apparatus forming a light wavelength analysis system at low costs can be provided without using a large-sized and expensive spectrum analyzer, a personal computer for external control, or the like as in the conventional system.

What is claimed is:

1. A wavelength-variable light source apparatus comprising:
   a wavelength-variable light source section comprising a RAM, a CPU, and a motor control section, and having an external resonance part for externally resonating emitted light from a semiconductor laser light source at a predetermined wavelength and for varying an external resonance condition in the external resonance part;

wherein the wavelength-variable light source section checks that the emitted light is the predetermined wavelength based on a positional signal from the motor control section and wherein said wavelength-variable light source section controls the external resonance part by outputting a motor control signal to said motor control section based on a table stored in the RAM; and a light source detection section for allowing light of each wavelength emitted from said wavelength-variable light source section to be incident on an object to be measured, detecting a light output level of output light of each wavelength emitted from the object to be measured, and sending a signal to said wavelength-variable light source section, wherein said signal indicates the light output level;

wherein said wavelength-variable light source section analyzes a light wavelength characteristic of the object to be measured based on the light output level of said signal output by said light detection section.

2. The wavelength-variable light source apparatus as claimed in claim 1, wherein said control section displays the light output level of each wavelength and the analysis result of the light wavelength characteristic of the object to be measured on a display section.

3. A wavelength-variable light source apparatus comprising:

a wavelength-variable light source section comprising a RAM, a CPU, and a motor control section, and having an external resonance part for externally resonating emitted light from a semiconductor laser light source at a predetermined wavelength and for varying an external resonance condition in the external resonance part;

wherein the wavelength-variable light source section checks that the emitted light is the predetermined wavelength based on a positional signal from the motor control section and wherein said wavelength-variable light source section controls the wavelength-variable light source by outputting a motor control signal to said motor control section based on a table stored in the RAM; and a light detection section for allowing light of each wavelength emitted from said wavelength-variable light source section to be incident on an object to be measured, and sending a signal to said wavelength-variable light source section over an exclusive communication line, wherein said signal indicating the light output level;

wherein said wavelength-variable light source section has a communication function for connecting to said light detection section over the exclusive communication line and analyzes a light wavelength characteristic of the object to be measured based on the light output level of each wavelength sent by said light detection section.

4. The wavelength-variable light source apparatus as claimed in claim 3, wherein said control section displays the light output level of each wavelength and the analysis result of the light wavelength characteristic of the object to be measured on a display section.

5. A wavelength-variable light source apparatus according to claim 1, wherein said motor control signal is based on a control program.

6. A wavelength-variable light source apparatus according to claim 1, wherein said motor control signal is based on a relationship between an emitted light wavelength and a motor rotation movement amount.

7. A wavelength-variable light source apparatus according to claim 3, wherein said motor control signal is based on a control program.

8. A wavelength-variable light source apparatus according to claim 3, wherein said motor control signal is based on a relationship between an emitted light wavelength and a motor rotation movement amount.

9. A wavelength-variable light source apparatus comprising:

a wavelength-variable light source section comprising a RAM, a CPU, and a motor control section, and having an external resonance part for externally resonating emitted light from a semiconductor laser light source at a predetermined wavelength and for varying an external resonance condition in the external resonance part, wherein said wavelength-variable light source section controls the wavelength-variable light source by outputting a motor control signal to said motor control section based on a table stored in the RAM;

a light source detection section for allowing light of each wavelength emitted from said wavelength-variable light source section to be incident on an object to be measured, detecting a light output level of output light of each wavelength emitted from the object to be measured, and sending a signal to said wavelength-variable light source section, wherein said signal indicates the light output level;

wherein said wavelength-variable light source section analyzes a light wavelength characteristic of the object to be measured based on the light output level of said signal output by said light detection section, and wherein the wavelength-variable light source section and the light source detection section are integrally formed in a unit.

* * * * *